Oct. 12, 1937.

C. E. HALLER 2,095,742

CONSTANT VOLTAGE RECTIFIER

Filed Aug. 15, 1934

WITNESSES:

INVENTOR
Cecil E. Haller.
BY
ATTORNEY

Patented Oct. 12, 1937

2,095,742

UNITED STATES PATENT OFFICE 2,095,742

CONSTANT VOLTAGE RECTIFIER

Cecil E. Haller, Owensboro, Ky., assignor to Westinghouse Electric & Manufacturing Company, East Pittsburgh, Pa., a corporation of Pennsylvania Application August 15, 1934, Serial No. 739,922

4 Claims. (Cl. 175—363)

My invention relates to rectifying circuits and it has particular relation to rectifying circuits in which the voltage of the output circuit should be maintained constant.

It is an object of my invention to provide a very sensitive automatic means for preventing any variation in the voltage of the input circuit of a rectifying system from varying the voltage of the output circuit.

Figure 1:
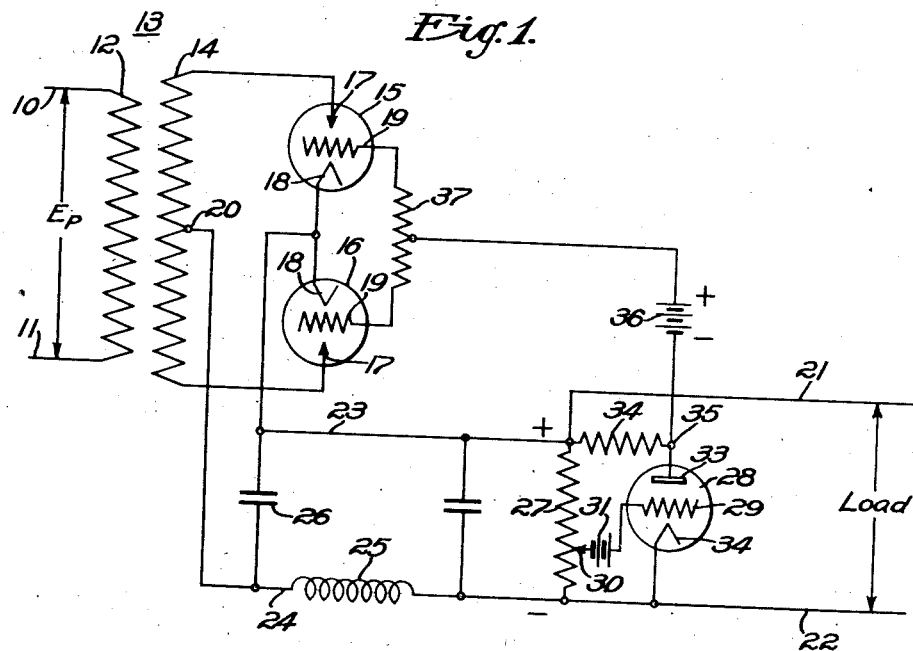
Figure 2:
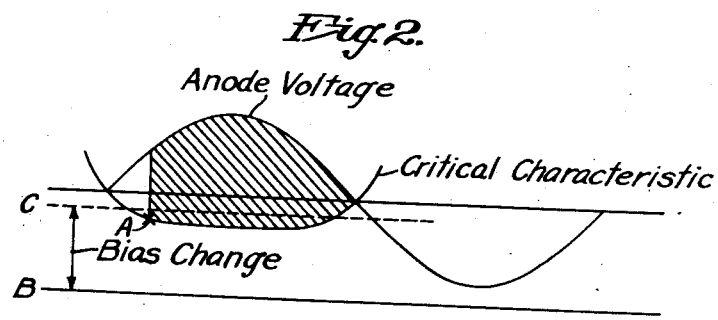

Other objects of my invention will become evident from the following detailed description taken in conjunction with the accompanying drawing, in which Figure 1 is a diagrammatic view of a rectifying system organized in accordance with the present invention, and, Fig. 2 is a diagrammatic view illustrating the theory of operation of the system.

Referring to the drawing, the system shown in Fig. 1 comprises an input circuit having the connections 10 and 11 to the primary 12 of the transformer 13 having a secondary 14. A grid controlled rectifier 15 is connected to the secondary 14 of the transformer 13. It is preferable to have an additional rectifier 16 connected also to the primary 14 in order to provide full wave rectification. The rectifiers are preferably of the type having a gas therein, and, of course, comprise the usual anode 17 and cathode 18 with an auxiliary electrode 19, preferably in the form of a grid. The usual connections of the anodes to the end of the secondary 14 of the transformer and from the cathode to the midpoint 20 of the secondary are, of course, well known.

The invention concerns the connections between the rectifier or rectifiers and the output circuit, represented by the wires 21 and 22, across which the load is connected. In general, these connections between the rectifier and the output circuit are represented by the lines 23 and 24. These connections preferably include inductance 25 and capacitance 26 to provide a filter for smoothing out minor variations in the current. Across the connections 23 and 24 is an impedance 27 which may be in the form of a potentiometer. Also, across the connections is an electron discharge device 28 preferably of the three electrode type with its grid 29 connected to a predetermined place 30 on the impedance 27. A battery 31 may be used to insure a positive potential on the grid 29. The control of the discharge tube 28 between the cathode 32 and the anode 33 is determined, however, by the potential of the place 30 on the impedance 27. An impedance 34 preferably in the form of a resistance is connected between the anode of the electron discharge device 28 and the positive side 23 of the rectifier circuit connections. The juncture 35 between the impedance 34 and the positive terminal of the tube 28 is connected to the grids 19 of the rectifier tubes 15 and 16. This connection includes a battery 36 designed to place a positive potential on the grids by passing through a suitable resistance 37 to these grids.

The operation of the circuit is as follows: The rectified current from the rectifiers 15 and 16 will pass through the conductors 23 and 24 to the output circuit 21 and 22. An increase in voltage across conductors 23 and 24 will effect the potential of the point 30 on the impedance 27 across the connections 23 and 24. An increase in voltage will bias the grid 29 of the tube 28 more positive and result in more current flowing across the tube. This will result in a greater voltage drop or IR drop across the impedance 34. The IR drop across the impedance 34 and the voltage of the battery 36 has previously been determined as greater than the critical value of the voltage for the breakdown of the two tubes 15 and 16.

This increased voltage drop across the impedance 34 will buck the potential from the battery 36 and will make the charge on the grids 19 of the rectifier tubes more negative with a result that the rectifiers will pass less current and thus prevent the characteristics of the output circuit from being affected adversely by this increase in input voltage.

If, on the other hand, the voltage of the input circuit decreases then the tube 28 will pass less current and the voltage drop across impedance 34 will decrease with the result that the charge on the grids 19 of the rectifier tubes will become more positive and the rectifiers will pass more current to make up for this decrease in input voltage.

The tube 28 amplifies the voltage change in the potentiometer 27 and makes this multiplied change effective enough to buck the battery 36 and thus to effectively change the charge on the grid 19.

In Fig. 2 are shown curves of the anode voltage and critical characteristics of the rectifier tube. When a grid voltage intersects the critical characteristic curve such as at A, then the rectifier conducts for the rest of the cycle as shown in shaded lines.

The input voltage may drop down so that the charge on the grid 19 would normally lower to B but the action of the tube 28 and resistance 34 creates the bias change illustrated at C to intersect the critical characteristic and make the rectifier conduct current.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A rectifying circuit comprising an input circuit, an output circuit, a rectifier having control means, said rectifier being connected to said input circuit and having connections to said output circuit, an impedance across said connections, an electron discharge device across said connections, the discharge therethrough being controlled by the potential of a predetermined place on said impedance and means connected to said electron discharge device and to the control means of said rectifier to apply a component of the plate circuit voltage of the electron discharge device to the control means of said rectifier for controlling the output current of the rectifier.

2. A rectifying circuit comprising an input circuit, an output circuit, a grid controlled rectifier connected to said input circuit and having connections to said output circuit, an impedance across said connections, an electron discharge device across said connections, the discharge therethrough being controlled by the potential of a predetermined place on said impedance and means connected to said electron discharge device and the grid of said rectifier for charging the grid more negative when the voltage of the input circuit increases and for charging the grid more positive when the voltage of the input circuit decreases.

3. A rectifying circuit comprising an input circuit, an output circuit, a grid controlled rectifier connected to said input circuit and having connections to said output circuit, an impedance across said connections, a second impedance and an electron discharge device in parallel with said first impedance, said electron discharge device being controlled by the potential of a predetermined place on said impedance, and a connection from said second named impedance and said electron discharge device to the grid of said grid controlled rectifier.

4. A circuit making connections between a supply circuit and a load circuit, a grid controlled rectifier having its main electrodes in one of said connections, a source of biasing potential connected to said grid, an impedance in parallel with the load circuit, a grid of a grid controlled discharge device connected to a place on said impedance, a branch circuit in parallel with said load circuit including the main electrodes of said grid controlled discharge device and a second impedance, the source of biasing potential for the grid of said grid controlled rectifier being connected to said branch circuit.

CECIL E. HALLER.